US007672936B2

(12) United States Patent
Dettinger et al.

(10) Patent No.: US 7,672,936 B2
(45) Date of Patent: Mar. 2, 2010

(54) SECURITY MODEL USING SECURITY DOMAINS IN A SECURITY MODEL APPLIED TO ABSTRACT DATABASE

(75) Inventors: Richard D. Dettinger, Rochester, MN (US); Daniel P. Kolz, Rochester, MN (US); Richard J. Stevens, Rochester, MN (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 11/693,478

(22) Filed: Mar. 29, 2007

(65) Prior Publication Data
US 2007/0185853 A1 Aug. 9, 2007

Related U.S. Application Data

(62) Division of application No. 10/901,593, filed on Jul. 29, 2004, now Pat. No. 7,228,307.

(51) Int. Cl.
*G06F 17/30* (2006.01)
(52) U.S. Cl. ......................................................... 707/3
(58) Field of Classification Search ..................... 707/2, 707/3, 9; 709/203
See application file for complete search history.

(56) References Cited

U.S. PATENT DOCUMENTS

| 6,725,227 | B1 | 4/2004 | Li |
| 6,820,082 | B1 * | 11/2004 | Cook et al. .................... 707/9 |
| 2004/0039736 | A1 | 2/2004 | Kilmer et al. |
| 2004/0078374 | A1 | 4/2004 | Hamilton |
| 2005/0022029 | A1 | 1/2005 | Potter et al. |

* cited by examiner

*Primary Examiner*—Etienne P LeRoux
(74) *Attorney, Agent, or Firm*—Patterson & Sheridan, LP

(57) ABSTRACT

The present invention generally is directed to a method, system and article of manufacture for controlling the access to data granted to a requesting entity based upon data accessed by the entity in the past. Additionally, embodiments of the present invention allow for access control independent from the particular manner in which the data is physically represented. Generally, abstraction layers are provided to represent various data sources available for use by an application and to compose queries used by the application to access and/or update information contained in these data sources. A runtime component is responsible for resolving an abstract query into concrete data access requests to one or more data repositories using information contained in a data repository abstraction component (one of the abstraction layers). Typically, data is organized into a series of domains. Within each domain, data is associated with an account. User activity is monitored, and when data associated with one account is accessed, a user may subsequently be prohibited from accessing data from a related account within the same domain.

20 Claims, 11 Drawing Sheets

```
                ABSTRACT QUERY                    ┌602
Selection:
     Institution = "Any"
     Release Date = "Any"
Results
     Account,
     Release
SWSM Domain = Customer Annoucement Dates
```

*FIG. 6A*

| QUERY BUILDER : RESULTS VIEW ||
| --- | --- |
| ACCOUNT | RELEASE DATES |
| MED_SCHOOL_1 | DATE |
| MED_SCHOOL_1 | DATE |
| MED_SCHOOL_2 | DATE |

*FIG. 6B*

| QUERY BUILDER ||
| --- | --- |
| ACCOUNT | ANNOUNCEMENT DATE |
| MED_SCHOOL_1 | 11/23/04 |
| MED_SCHOOL_1 | 1/1/05 |
| MED_SCHOOL_2 | UNAVAILABLE |

*FIG. 6D*

DATA                                                                    X

FILE  EDIT  VIEW  GO

← → ▣ X    HTTPS : //

SEARCH RESULTS

| ACCOUNT | DATE |
|---|---|
| MED_SCHOOL_1 | 11/12/2004 |
| MED_SCHOOL_1 | 12/15/2004 |
| MED_SCHOOL_1 | 1/1/2006 |

[NB : CERTAIN RESULTS FOR OTHER SECURITY ACCOUNTS MAY NOT BE SHOWN DUE TO PRIOR ACTIONS]

OR

| ACCOUNT | DATE |
|---|---|
| MED_SCHOOL_1 | 11/12/2004 |
| MED_SCHOOL_1 | 12/15/2004 |
| MED_SCHOOL_2 | SECURITY OVERRIDE |

*FIG 7*

| DOMAIN / USERS | UNIVERSITIES | HOSPITALS | ... | OTHER DOMAINS |
|---|---|---|---|---|
| SMITH | | | | |
| JONES | | | | |
| ... | | | | |
| KOWALSKI | | | | |
| ... | | | | |
| BURNS | MED_SCHOOL_1 | MED_SCHOOL_2 | | |
| ... | | | | |
| ... | | | | |
| SIMPSON | | | | |

FIG. 8

SECURITY MODEL USING SECURITY DOMAINS IN A SECURITY MODEL APPLIED TO ABSTRACT DATABASE

CROSS REFERENCE TO RELATED APPLICATION

This patent application is a divisional application of co-pending patent application Ser. No. 10/901,593, entitled "SECURITY MODEL USING SECURITY DOMAINS IN A SECURITY MODEL APPLIED TO ABSTRACT DATABASE", filed by Dettinger, et al, on Jul. 29, 2004, which is incorporated herein by reference.

BACKGROUND OF THE INVENTION

1. Field of the Invention

The present invention generally relates to a method of managing confidential data and to partitioning access to confidential data maintained in an abstract database based on user activity.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application, the operating system or a user) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). The term "query" denominates a set of commands for retrieving data from a stored database. Queries take the form of a command language that lets programmers and programs select, insert, update, find out the location of data, and so forth.

One of the issues faced by data mining and database query applications, in general, is their close relationship with a given database schema (e.g., a relational database schema). This relationship makes it difficult to support an application as changes are made to the corresponding underlying database schema. Further, the migration of the application to alternative underlying data representations is inhibited. In today's environment, the foregoing disadvantages are largely due to the reliance applications have on SQL, which presumes that a relational model is used to represent information being queried. Furthermore, a given SQL query is dependent upon a particular relational schema since specific database tables, columns and relationships are referenced within the SQL query representation. As a result of these limitations, a number of difficulties arise.

One difficulty is that changes in the underlying relational data model require changes to the SQL foundation that the corresponding application is built upon. Therefore, an application designer must either forgo changing the underlying data model to avoid application maintenance or must change the application to reflect changes in the underlying relational model. Another difficulty is that extending an application to work with multiple relational data models requires separate versions of the application to reflect the unique SQL requirements driven by each unique relational schema. Yet another difficulty is evolution of the application to work with alternate data representations because SQL is designed for use with relational systems. Extending the application to support alternative data representations, such as XML, requires rewriting the application's data management layer to use non-SQL data access methods.

A typical approach used to address the foregoing problems is software encapsulation. Software encapsulation involves using a software interface or component to encapsulate access methods to a particular underlying data representation. An example is found in the Enterprise JavaBean (EJB) specification that is a component of the Java 2 Enterprise Edition (J2EE) suite of technologies. In the case of EJB, entity beans serve to encapsulate a given set of data, exposing a set of Application Program Interfaces (APIs) that can be used to access this information. This is a highly specialized approach requiring the software to be written (in the form of new entity EJBs) whenever a new set of data is to be accessed or when a new pattern of data access is desired. The EJB model also requires a code update, application build and deployment cycle to react to reorganization of the underlying physical data model or to support alternative data representations. EJB programming also requires specialized skills; since more advanced Java programming techniques are involved. Accordingly, the EJB approach and other similar approaches are rather inflexible and costly to maintain for general-purpose query applications accessing an evolving physical data model.

Additional difficulties arise when one entity acts as a service provider for multiple, sometimes competing, accounts. For example, a provider may offer database storage, query and retrieval services to multiple competing entities. Although necessary, it is not sufficient for the database services provider to ensure that data belonging to one entity is protected from access by others. First, competing entities sometimes wish to share limited amounts of data related to a particular joint venture. By engaging in cooperative and joint ventures, many business entities necessarily share data with one another. Thus, simply segregating access to data by entity is inadequate.

Further, the service provider may provide services to entities that are themselves competitors. As agents of the service provider work with one entity (e.g. providing consulting services), they may be exposed to confidential data belonging to one account. Although an employee may be authorized to access the data from any one account, very few employees should be able to access the data from two or more competitors' accounts. Having access to the data from two accounts creates two problems. First, agents of the service provider may intentionally compromise information belonging to one account at the expense of another. In other words, data theft may occur. Second, having access to information from multiple accounts may create conflicts of interest. That is, agents of the service provider should not be allowed to consult with one client while having insider knowledge of the plans, status or standing of a competing account.

An additional problem is that information leakage may corrupt a company's intellectual property rights. For example, serious problems of ownership and conception arise when the ideas, data, or results generated by one group of researches leak into another. This may happen accidentally if a consultant becomes exposed to ideas from two competing projects and assumes that the ideas may be freely used in either.

Accordingly, there is a need for improved and more flexible methods for accessing data that are not limited to the particular manner in which the underlying physical data is represented. Further, such methods should provide for the security of confidential data and prevent access to confidential data by individuals that would lead to conflicts of interest or other inappropriate disclosures.

SUMMARY OF THE INVENTION

The present invention provides methods, apparatus and an article of manufacture for managing access to data. One embodiment of the present invention provides a method for controlling access to data stored in multiple data repositories and accessible by multiple entities. The method generally includes receiving, from a requesting entity, an abstract query composed from a set of logical fields, wherein each logical field provides an access method that specifies at least a method for accessing the data and a security domain associated with the logical field. And for each logical field, generating a query contribution for retrieving query result data, modifying each query contribution to additionally retrieve security account information corresponding to query result data to be retrieved by the query contribution, and retrieving the query result data from the multiple data repositories using the modified query contribution for the logical field. The method generally further includes, determining whether the requesting entity is authorized to access the query result data, combining the query result data from the logical fields into a set of combined query results, and returning an indication of the combined query results to the requesting entity.

Another embodiment of the invention provides a system for managing access to data stored in data repositories. The system generally includes a data abstraction model, wherein the data abstraction model comprises a plurality of logical fields used to compose an abstract query; and for each logical field, providing an access method specifying at least a method for accessing the data and a location of the data, and the system includes a security model wherein at least one of the plurality of logical fields identifies a security domain associated with the logical field, wherein the security domain defines a collection of security accounts associated with each security domain and wherein data stored in the data repositories is associated with a security account. The system further generally includes a query engine configured to resolve an abstract query into a query consistent with a particular physical data representation of the data stored in at least one of the multiple data repositories, to modify the query to identify the security account associated with the data retrieved by the query, and to execute the query against the data repositories, retrieving a query result data that includes a security account identifier. The system further generally includes a security component configured to replace query result data associated with a security account with an indication of the query result data, and to determine whether a entity submitting an abstract query may access the query result data, and a security matrix that records which security accounts and security domains associated with the query result data are accessed by an entity submitting an abstract query.

Another embodiment of the present invention provides a computer-readable medium containing a program which, when executed, performs operations. The operations generally comprise receiving, from a requesting entity, an abstract query composed from a set of logical fields, wherein each logical field provides an access method that specifies at least a method for accessing data stored a set of multiple data repositories and a security domain associated with the logical field. And for each logical field: generating a query contribution for retrieving query result data stored in the multiple data repositories; modifying each query contribution to additionally retrieve security account information corresponding to the query result data to be retrieved by the query contribution and retrieving the query result data from the multiple data repositories using the modified query contribution for the logical field. The operations generally further include determining whether the requesting entity is authorized to access the query result data, combining the query result data from the logical fields into a set of completed query results, and returning an indication of the combined query results to the requesting entity. The operations generally still further include identifying the requesting entity, determining whether the requesting entity has previously accessed data from the same security domain as the security domain provided by the logical field, and if not, including an indication in the combined query results that data from the security domain is available for access; otherwise, comparing the security account associated with the query result data with the security account of the data previously accessed by the requesting entity, and if the security accounts match, including the query result data in the combined query results.

Another embodiment of the invention provides a method for managing access to data. The method generally further includes, receiving, from a requesting entity, an abstract query comprising at least one condition referring to a logical field, wherein the logical field is defined in a data abstraction model and any data to be retrieved for the abstract query satisfies the condition, and identifying the requesting entity. The method generally further includes determining a security account associated with the condition, and determining, based on the security account, whether the requesting entity is prohibited from accessing data for the logical field that satisfies the condition based on prior accesses made of data associated with a security account other than the security account associated with the condition.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6A shows an illustrative abstract query comprising a plurality of logical fields;

FIGS. 6B, 6C and 6D illustrate graphical user interface screens;

FIG. 7 shows an illustrative abstract query and an underlying relational database table;

FIG. 8 shows a security matrix, according to one embodiment of the invention.

DETAILED DESCRIPTION OF THE PREFERRED EMBODIMENTS INTRODUCTION

Figure 1:
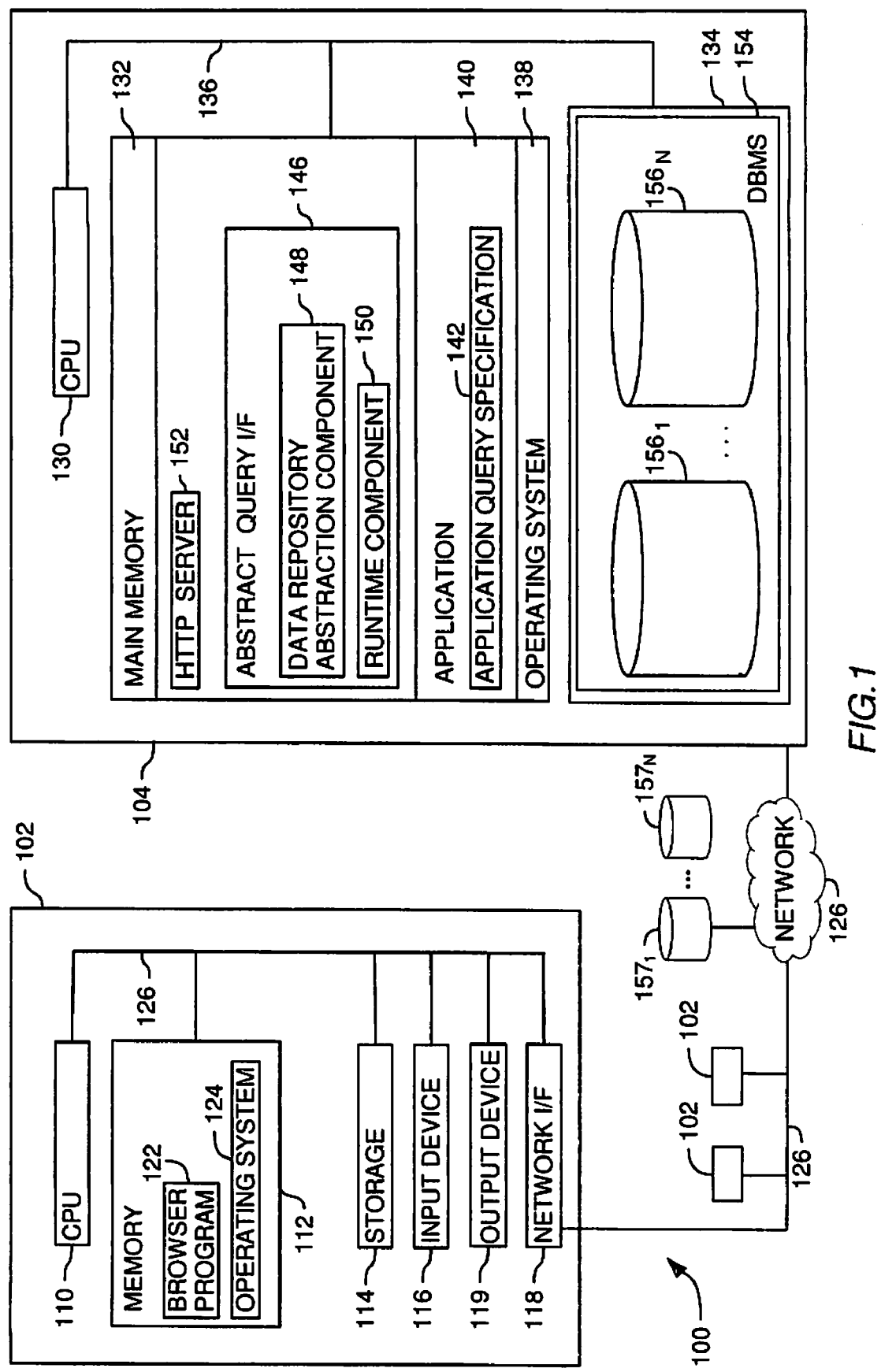
FIG. 1 is a computer system illustratively used in accordance with the invention.

The present invention is generally directed to a method, system and article of manufacture for accessing data independently from the physical representation of the data. In one embodiment, a data abstraction model provides a data repository abstraction layer that presents users with a logical view of one or more underlying data repositories, independently from a particular mechanism of data representation. Generally, abstraction layers represent various distributed data sources available for use by a query application and define how queries may be composed that access and update information stored in an underlying physical data source. Additionally, the present invention allows an entity providing database services using a data abstraction model to address certain security concerns associated with managing data for multiple competing entities.

Embodiments of the present invention may also be used to segment different groups within a single organization from one another. For example, one group of engineers might be responsible for creating a specification describing the functional behavior of a particular integrated circuit. A second group of engineers may be responsible for developing an integrated circuit from only the behavioral specification. This process is commonly known as "reverse engineering." Care must be taken to prevent any data generated by the first group from leaking to the second, and vice-versa. In other words, any individual who views data associated with one group must be prevented from viewing data associated with the other.

A Security wall security model (SWSM) may be used to prevent the conflicts of interest that may occur when a user accesses data associated with a particular account. The basic rule of the SWSM is that people are allowed to access data only when it does not create a conflict of interest based on data they have previously accessed. Under the SWSM, all of the data items belonging to an entity are marked as belonging to a SWSM account for the entity. Data items that may belong to a SWSM account include any conceivable type of information stored in a computer. SWSM accounts are grouped together to form SWSM domains. Each SWSM domain includes the SWSM accounts where access to different accounts within the SWSM domain could create a conflict of interest. For example, a SWSM domain might include the SWSM accounts belonging to different research institutions that employ a particular database services provider. Employees of the database services provider can work with many clients, but cannot work with more than one research institution without creating a conflict of interest.

In the parlance of the SWSM, the system constructs a Security wall around a user that has accessed information belonging to a SWSM account within a SWSM domain, and thereafter prevents that user from accessing information within the same SWSM domain belonging to other SWSM accounts.

In one embodiment, a runtime component resolves an abstract query into concrete data access requests made to one or more data repositories using information contained in a data repository abstraction component (an abstraction layer). While processing queries, the runtime component may modify an abstract query to include a SWSM query contribution that retrieves SWSM account information from the physical data source along with the data requested by the query. GUI elements may be used to present the user with an indication of the security consequences of a proposed transaction, or to inform a user that the SWSM prohibits a requested transaction. For example, an output formatter may be used to interpose a layer between data that a user is not authorized to access or to inform the user of the security consequences of a proposed action. In another embodiment, where a user has the ability to compose an abstract query that will insert new (or modify existing) data stored in a data source, the SWSM prevents users from writing information to one account in a SWSM domain when the user is prohibited from accessing data in the same account.

Embodiments of the invention may enforce the SWSM model at the data repository abstraction layer. Thus, despite an evolving topology of underlying data sources, data protected by a SWSM domain remains consistent with the logical view of the data provided by the data abstraction model. Additionally, users may compose abstract queries to retrieve data protected by a SWSM domain based on the SWSM account within the domain. That is, users may access data based on it being "on their side of the wall." Additionally, as users access data (and the system erects a SWSM wall around the data accessible by a user) the data abstraction model may limit the fields displayed and made available to a user for composing queries. In other words, the system may remove certain logical fields associated with a SWSM account from the data abstraction component after a user accesses data using fields associated with a different SWSM account.

Although characterized as a "wall," embodiments of the present invention allow the control of when a user is allowed to "peek over the wall" and access data protected by a SWSM domain. For example, an entity may chose to publicize previously confidential data, or data related to when an event is scheduled to occur may no longer require protection once the date passes. Accordingly, a user who is prevented from accessing data "on the other side of the wall" at one point in time, may later have access to the same data once it becomes public, or when it no longer requires confidential treatment (i.e., would no longer create a conflict of interest within a SWSM domain for the accessing user).

In one embodiment, users may be allowed to view data from more than one account in a SWSM domain (i.e., "move" through the Security wall). In such an embodiment, the system records this "movement" and marks a user as being contaminated between the two SWSM accounts, or provides a message to an appropriate individual (e.g., an automated e-mail) with responsibility for maintaining the SWSM. Doing so allows security decisions to be overtly selected and for an auditable record of user activity to be created.

One embodiment of the invention is implemented as a program product for use with a computer system such as, for example, the network environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 depicts a block diagram of a networked system 100 in which embodiments of the present invention may be implemented. In general, the networked system 100 includes a client (e.g., user's) computer 102 (three such client computers 102 are shown) and at least one server 104 (one such server 104). The client computer 102 and the server computer 104 are connected via a network 126. In general, the network 126 may be a local area network (LAN) and/or a wide area network (WAN). In one embodiment, the network 126 is the Internet.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, track-ball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any device configured to allow network communications between the client computer 102 and the server computer 104 via the network 126. For example, the network interface device 118 may be a network adapter or other network interface card. Storage 114 is preferably a Direct Access Storage Device. Although shown as a single unit, it could be a combination of fixed and/or removable storage devices, such as fixed disc drives, floppy disc drives, tape drives, removable memory cards, or optical storage. The memory 112 and storage 114 may be part of one virtual address space spanning multiple primary and secondary storage devices. The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

The memory 112 contains of an operating system 124. Illustrative operating systems, which may be used to advantage, include Linux® and Microsoft's Windows®. More generally, any operating system supporting the functions disclosed herein may be used. The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any GUI-based program capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104. The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140 and an abstract query interface 146. The applications 140 and the abstract query interface 146 are software products comprising a plurality of instructions that are resident at various times in various memory and storage devices in the computer system 100. When read and executed by one or more processors 130 in the server 104, the applications 140 and the abstract query interface 146 cause the computer system 100 to perform the steps necessary to execute steps or elements embodying the various aspects of the invention. The applications 140 (and more generally, any requesting entity, including the operating system 138 and, at the highest level, users) issue queries against a database. Illustrative against which queries may be issued include local databases $156_1 \ldots 156_N$, and remote databases $157_1 \ldots 157_N$, collectively referred to as database(s) 156-157). Illustratively, the databases 156 are shown as part of a database management system (DBMS) 154 in storage 134. More generally, as used herein, the term "databases" refers to any collection of data regardless of the particular physical representation. By way of illustration, the databases 156-157 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed using logical fields defined by the abstract query interface 146. In particular, the logical fields used in the abstract queries are defined by a data repository abstraction component 148 of the abstract query interface 146. The abstract queries are executed by a runtime component 150 that transforms the abstract queries into a form consistent with the physical representation of the data contained in one or more of the databases 156-157. The application query specification 142 and the abstract query interface 146 are further described with reference to FIGS. 2A-B.

In one embodiment, elements of a query are specified by a user through a graphical user interface (GUI). The content of the GUIs is generated by the application(s) 140. In a particular embodiment, the GUI content is hypertext markup language (HTML) content which may be rendered on the client computer systems 102 with the browser program 122. Accordingly, the memory 132 includes a Hypertext Transfer Protocol (http) server process 138 (e.g., a web server) adapted to service requests from the client computer 102. For example, the process 138 may respond to requests to access a database(s) 156, which illustratively resides on the server 104. Incoming client requests for data from a database 156-157 invoke an application 140. When executed by the processor 130, the application 140 causes the server computer 104 to perform the steps or elements embodying the various aspects of the invention, including accessing the database(s) 156-157. In one embodiment, the application 140 comprises a plurality of servlets configured to build GUI elements, which are then rendered by the browser program 122. Where the remote databases 157 are accessed via the application 140, the data repository abstraction component 148 is configured with a location specification identifying the database containing the data to be retrieved. This latter embodiment will be described in more detail below.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable future changes in a particular markup language as well as to other languages presently unknown. Likewise, the http server process 152 shown in FIG. 1 is merely illustrative, and other embodiments of the invention may be adapted to support any known and unknown protocols.

Additionally, as described herein, the runtime component 150 is configured to enforce the restrictions of the SWSM. Other embodiments may implement a separate SWSM security component (e.g. a separate software module or process running on server computer 104) or implement a hybrid scheme that distributes aspects of the present invention across several processes. Accordingly, incorporating SWSM security functions into the runtime component 150 is solely for ease of description and not limiting of the invention.

Logical/Runtime View of Environment

Figure 2A:
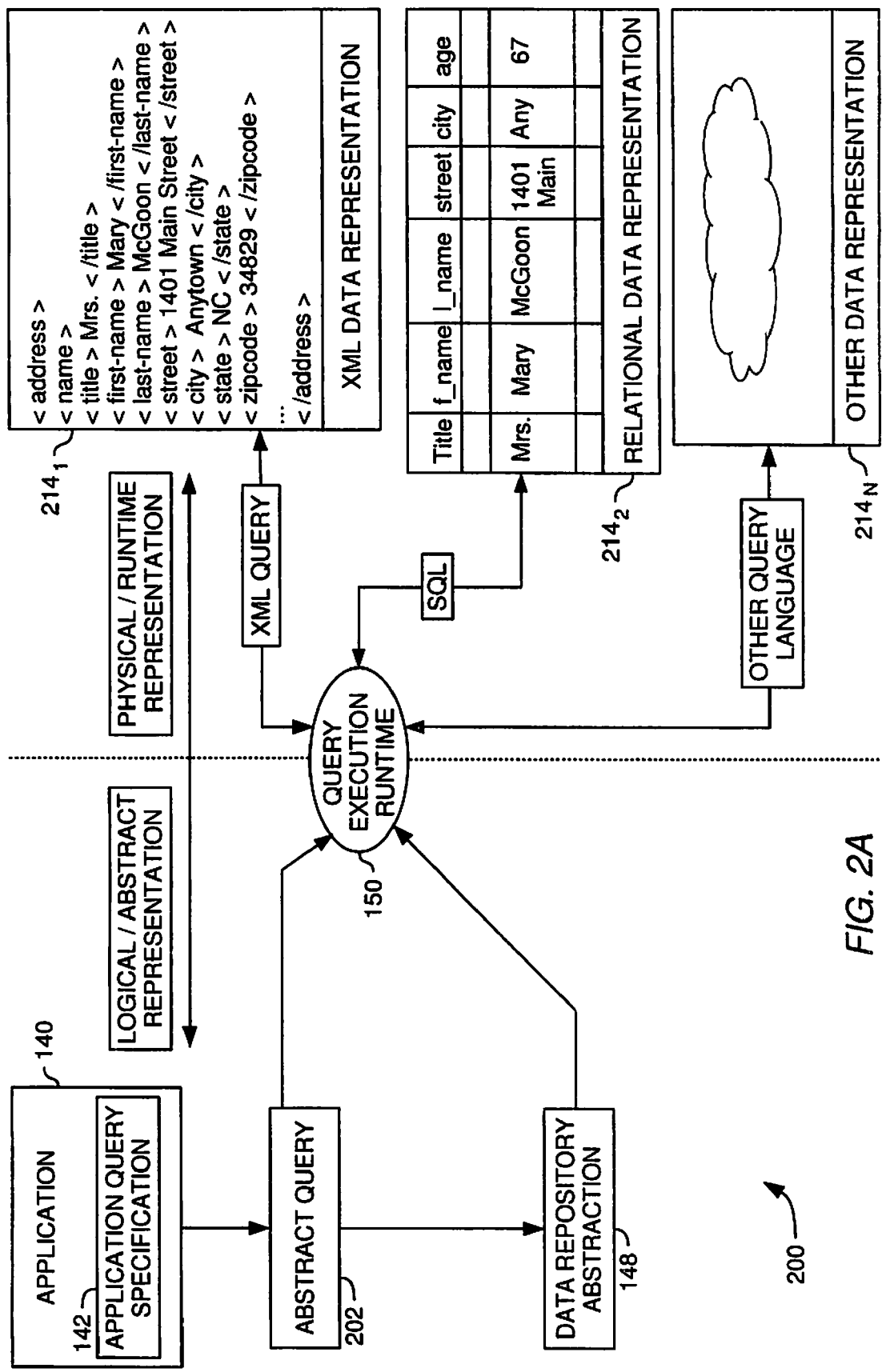
FIG. 2A is an illustrative relational view of software components.
Figure 2B:
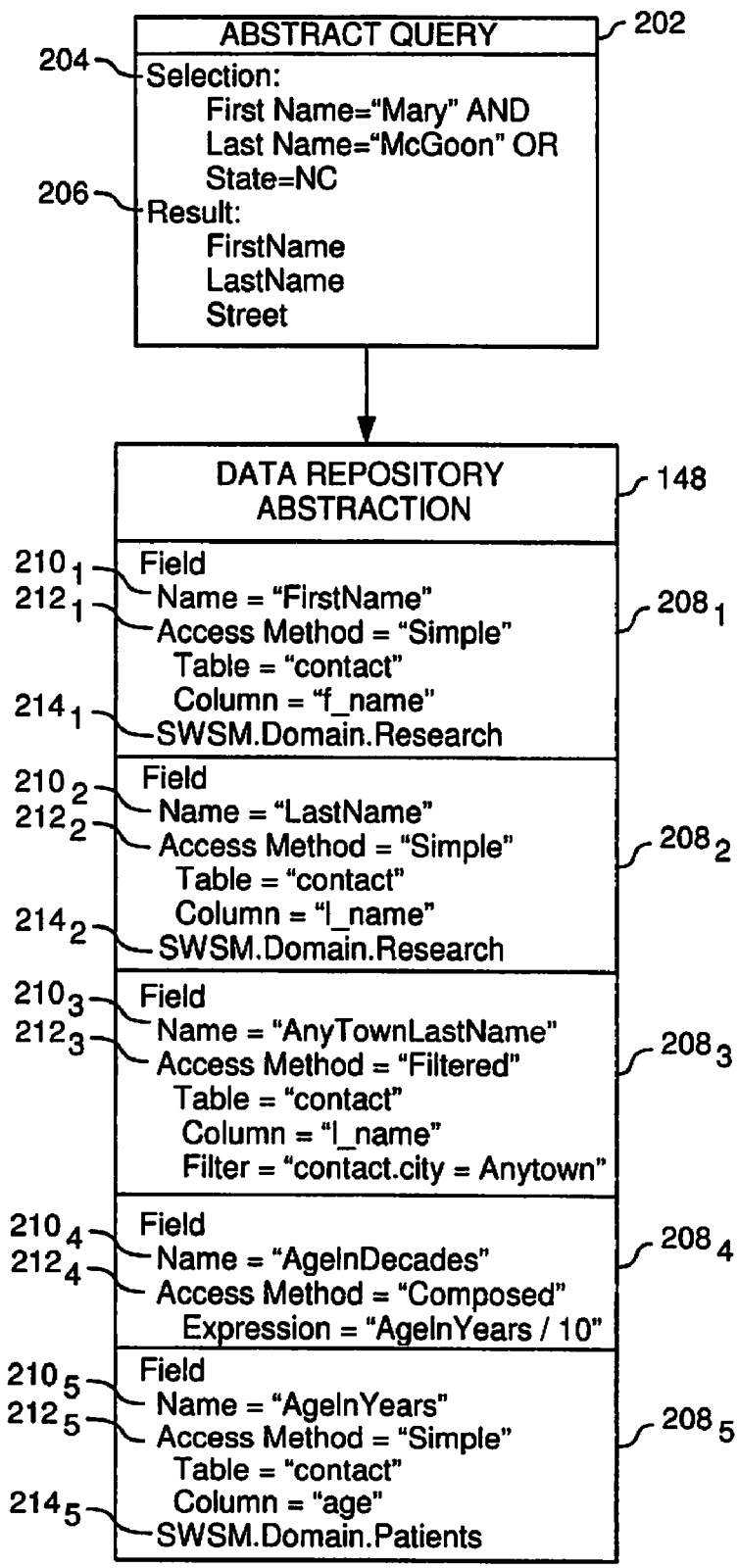
FIG. 2B is one embodiment of an abstract query and a data repository abstraction for a relational data access.

FIGS. 2A-B show a plurality of interrelated components of the invention. The requesting entity (e.g., one of the applications 140) issues a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the databases 156-157. As a result, abstract queries may be defined that are independent of the particular underlying data representation used. In one embodiment, the application query specification 142 may include both criteria used for data selection (selection criteria 204) and an explicit specification of the fields to be returned (result data specification 206) based on the selection criteria 204.

The logical fields specified by the application query specification 142 and used to compose the abstract query 202 are defined by the data repository abstraction component 148. In general, the data repository abstraction component 148 exposes information as a set of logical fields that may be used within a query (e.g., the abstract query 202) issued by the application 140 to specify criteria for data selection and specify the form of result data returned from a query operation. The logical fields are defined independently of the underlying data representation being used in the databases 156-157, thereby allowing queries to be formed that are loosely coupled to the underlying data representation.

In general, the data repository abstraction component 148 comprises a plurality of field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification comprises a logical field name $210_1$, $210_2$, $210_3$, $210_4$, $210_5$ (collectively, field name 210) and an associated access method $212_1$, $214_2$, $212_3$, $212_4$, $212_5$ (collectively, access method 212). The access methods associate (i.e., map) the logical field names to a particular physical data representation $214_1$, $214_2$ ... $214_N$ in a database (e.g., one of the databases 156). By way of illustration, two data representations are shown, an XML data representation $214_1$ and a relational data representation $214_2$. However, the physical data representation $214_N$ indicates that any other data representation, known or unknown, is contemplated.

Any number of access methods is contemplated. In one embodiment, access methods for simple fields, filtered fields and composed fields are provided. The field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("FirstName") to a column named "f_name" in a table named "contact". The field specification $208_3$ exemplifies a filtered field access method $212_3$. Filtered fields identify an associated physical entity and provide rules used to define a particular subset of items within the physical data representation. An example is provided in FIG. 2B in which the filtered field access method $212_3$ maps the logical field name $210_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information which does not exist in the underlying data representation may be computed. In the example illustrated in FIG. 2B, the composed field access method $212_3$ maps the logical field name $210_3$ "AgeInDecades" to "AgeInYears/10". Another example is a sales tax field that is composed by multiplying a sales price field by a sales tax rate.

The formats for any given data type (e.g., dates, decimal numbers, etc.) of the underlying data may vary. Accordingly, in one embodiment, the field specifications 208 include a type attribute which reflects the format of the underlying data. In another embodiment, however, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

Each field specification 208 may also identify a SWSM domain. A security attribute 214 specifies the SWSM domain associated with a logical field. Illustratively, field specifications $208_{1-5}$ map to a "contact" table and specifies that these logical fields belong to a "research" SWSM domain. In this example, the SWSM "research" domain might include demographic information related to the participants of multiple research studies conducted by competing research groups. In such a SWSM domain, each research group may be designated as a SWSM account. Accordingly, the system constructs a Security wall around a user that accesses demographic information associated with one of the SWSM accounts. Thereafter, the user is prevented from accessing data associated with other research groups (SWSM accounts) in the SWSM "research" domain.

By way of example, the field specifications 208 of the data repository abstraction component 148 shown in FIG. 2 are representative of logical fields mapped to data represented in the relational data representation $214_2$. However, other instances of the data repository abstraction component 148 map logical fields to other physical data representations, such as XML. The data repository abstraction component 148 shown in FIG. 2B is merely illustrative of selected logical field specifications and is not intended to be comprehensive. Thus, the abstract query 202 shown in FIG. 2B includes some logical fields for which specifications are not shown in the data repository abstraction component 248, such as "State" and "Street".

An illustrative abstract query corresponding to the abstract query 202 shown in FIG. 2B is shown in Table I below. By way of illustration, the data repository abstraction 548 is defined using XML. However, any other language may be used to advantage.

TABLE I

QUERY EXAMPLE

| | |
|---|---|
| 001 | <?xml version="1.0"?> |
| 002 | <!--Query string representation: (FirstName = "Mary" AND LastName = |
| 003 | "McGoon") OR State = "NC"--> |
| 004 | <QueryAbstraction> |
| 005 | <Selection> |
| 006 |   <Condition internalID="4"> |
| 007 |     <Condition field="FirstName" operator="EQ" value="Mary" |
| 008 | internalID="1"/> |
| 009 |     <Condition field="LastName" operator="EQ" value="McGoon" |
| 010 | internalID="3" relOperator="AND"></Condition> |
| 011 |   </Condition> |
| 012 |   <Condition field="State" operator="EQ" value="NC" internalID="2" |
| 013 | relOperator="OR"></Condition> |
| 014 | </Selection> |
| 015 | <Results> |
| 016 |   <Field name="FirstName"/> |
| 017 |   <Field name="LastName"/> |
| 018 |   <Field name="State"/> |
| 019 | </Results> |
| 020 | </QueryAbstraction> |

Illustratively, the abstract query shown in Table I includes a selection specification (lines 005-014) containing selection criteria and a results specification (lines 015-019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative instance of a data repository abstraction component 148 corresponding to the abstract query in Table I is shown in Table II below. By way of illustration, the data repository abstraction component 148 is defined using XML. However, any other language may be used to advantage.

TABLE II

DATA REPOSITORY ABSTRACTION EXAMPLE

| | |
|---|---|
| 001 | <?xml version="1.0"?> |
| 002 | <DataRepository> |
| 003 |   <Category name="Demographic"> |
| 004 |     <Field queryable="Yes" name="FirstName" displayable="Yes"> |
| 005 |       <AccessMethod> |
| 006 |         <Simple columnName="f_name" tableName="contact"></Simple> |
| 007 |       </AccessMethod> |
| 008 |       <Type baseType="char"></Type> |
| 009 |       <SWSM domain="yes" name="research" account="contact.account"> |
| 010 |     </Field> |
| 011 |     <Field queryable="Yes" name="LastName" displayable="Yes"> |
| 012 |       <AccessMethod> |
| 013 |         <Simple columnName="l_name" tableName="contact"></Simple> |
| 014 |       </Access Method> |
| 015 |       <Type baseType="char"></Type> |
| 016 |       <SWSM domain="yes" name="research" account="contact.account"> |
| 017 |     </Field> |
| 018 |     <Field queryable="Yes" name="State" displayable="Yes"> |
| 019 |       <AccessMethod> |
| 020 |         <Simple columnName="state" tableName="contact"></Simple> |
| 021 |       </AccessMethod> |

TABLE II-continued

DATA REPOSITORY ABSTRACTION EXAMPLE

```
022         <Type baseType="char"></Type>
023         <SWSM domain="yes" name="research" account="contact.account">
024      </Field>
025    </Category>
026 </DataRepository>
```

Note that lines 004-010 correspond to the first field specification $208_1$ of the data repository abstraction component 148 shown in FIG. 2B and lines 010-017 correspond to the second field specification $208_2$. For brevity, the other field specifications defined in Table I have not been shown in FIG. 2B. Note also that Table I illustrates a category, in this case "Demographic". A category is a grouping of one or more logical fields. In the present example, "First Name", "Last Name" and "State" are logical fields belonging to the common category, "Demographic".

Lines 9, 16, and 23 each specify a SWSM domain 215 associated with the logical fields 208. In addition to naming a SWSM domain 215, these lines also specify attributes used to determine the SWSM account corresponding to information retrieved from the physical data source. For example, field specifications $208_1$ use a simple access method that maps the logical field "First Name" to a column in a named relational table. Each element in the column may be associated with a different account in a SWSM domain. For field specification $208_1$, the "account" attribute identifies which account corresponds to elements appearing in the "f_name." Illustratively, each row of the "contact" table referenced by field specification $208_1$ may include an account column. Alternatively, the SWSM account attribute may specify a column appearing in a second table to join with the "f_name" column or another logical field which would have an access method that maps to the account attribute.

After being transformed into a concrete query by a runtime component 150, abstract queries are executed. The transformation of abstract queries into concrete queries is described below in detail.

Figure 3:
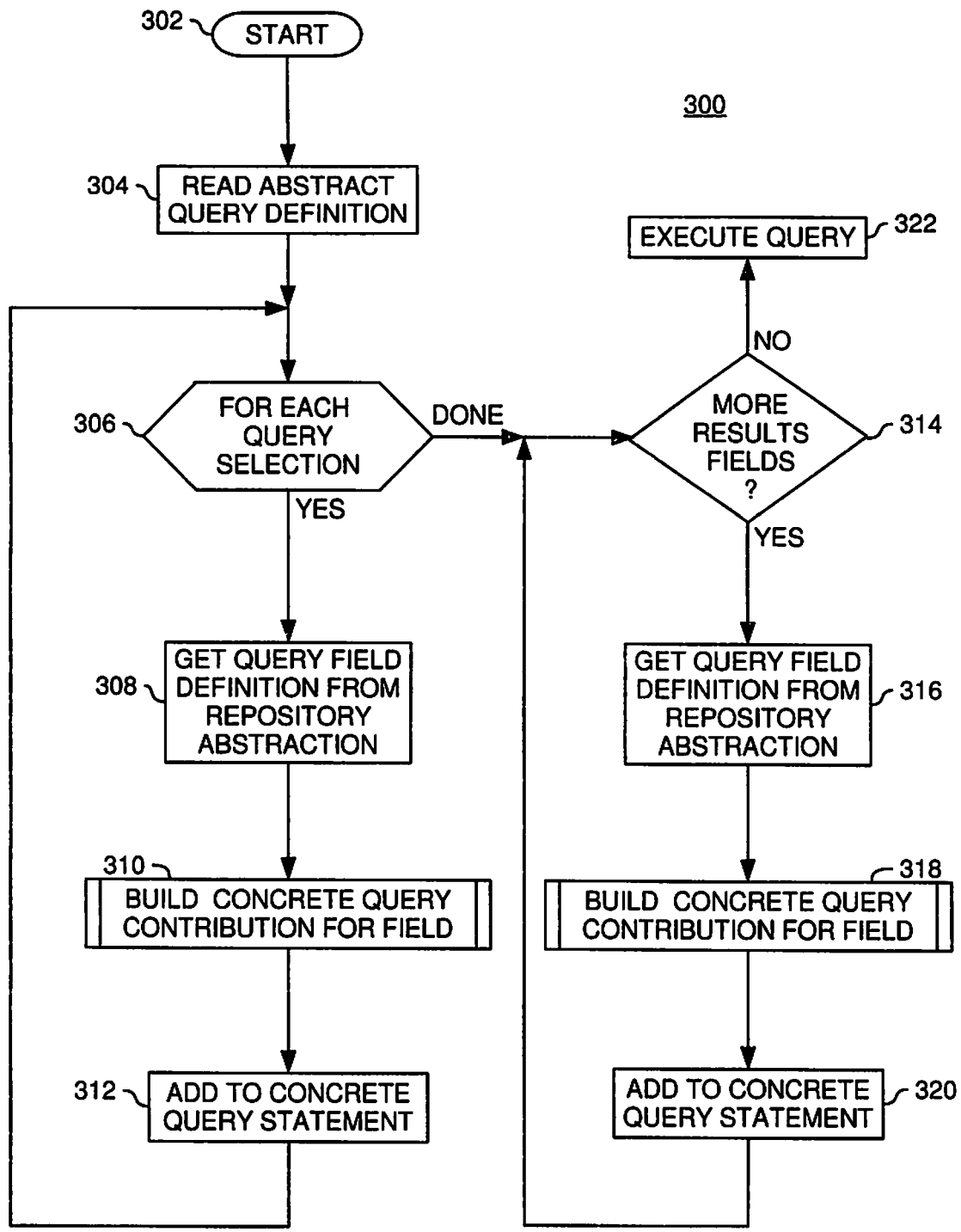
FIGS. 3 and 4 are flow charts illustrating the operation of a runtime component.

FIG. 3 shows an illustrative runtime method 300 of the operations of the runtime component 150, according to an embodiment of the invention. The method 300 is entered at step 302 when the runtime component 150 receives as input an instance of an abstract query (such as the abstract query 202 shown in FIG. 2). At step 304, the runtime component 150 and parses the abstract query and determines individual selection criteria and desired result fields included in the abstract query. At step 306, the runtime component 150 enters a loop (comprising steps 306, 308, 310 and 312) for processing each query selection criteria statement present in the abstract query, thereby building a data selection portion of a concrete query. In one embodiment, a selection criterion consists of a field name (for a logical field), a comparison operator (=, >, <, etc) and a value expression (what the field is being compared to). At step 308, the runtime component 150 uses the field name from a selection criterion of the abstract query to look up the definition of the field in the data repository abstraction 148.

As noted above, the field specification includes an indication of the access method used to access the physical data associated with the logical field and may identify a SWSM domain 215 associated with the logical field. Runtime component 150 then builds (step 310) a concrete query contribution for the logical field being processed that includes logic to retrieve the SWSM information. As defined herein, a query contribution is a portion of a concrete query that is used to perform data selection based on the current logical field.

Concrete queries are represented in languages like SQL and XML X-Query and is consistent with the data of a given physical data repository (e.g., a relational database or XML repository). Accordingly, the concrete query is used to locate and retrieve data from a physical data repository, represented by the databases 156-157 shown in FIG. 1. The concrete query contribution generated for the current field is then added to a concrete query statement. The method 300 then returns to step 306 to begin processing for the next field of the abstract query. The runtime component 150 iterates the process entered at step 306 each data selection field in the abstract query, generating additional content to the completed concrete query.

After building the data selection portion of the concrete query, the runtime component 150 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 300 enters a loop at step 314 (defined by steps 314, 316, 318 and 320) to add result field definitions to the concrete query being generated. At step 316, the runtime component 150 looks up a result field name (from the result specification of the abstract query) in the data repository abstraction 148 and then retrieves a Result Field Definition from the data repository abstraction 148 to identify the physical location of data to be returned for the current logical result field. The runtime component 150 then builds (as step 318) a concrete query contribution (of the concrete query that identifies physical location of data to be returned) for the logical result field. Similar to step 310, the runtime component 150 may identify a SWSM domain associated with each result field and modify the concrete query contribution to include SWSM account information for each result field. At step 320, concrete query contribution is then added to the concrete query statement. Once each of the result fields in the abstract query has been processed, the query is executed at step 322.

Figure 4:
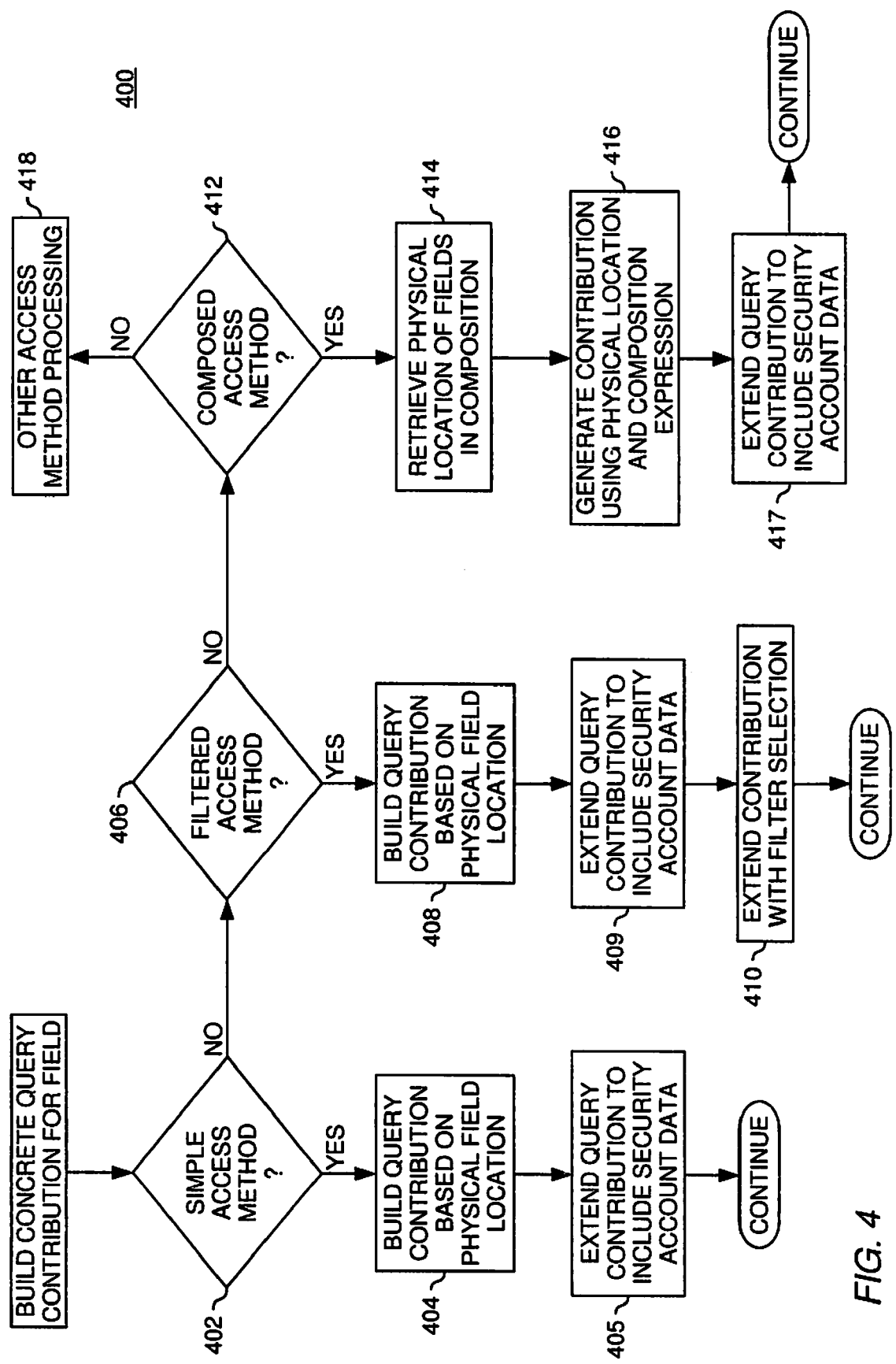

One embodiment of a method 400 for building a concrete query contribution for a logical field according to steps 310 and 318 is described with reference to FIG. 4. At step 402, the method 400 queries whether the access method associated with the current logical field is a simple access method. If so, the concrete query contribution is built (step 404) based on physical data location. Along with the query contribution for the logical field, at step 405, the runtime component 150 extends the concrete query contribution to include account information for the data stored at the physical location. Processing then continues according to method 300 described above. Otherwise, processing continues to step 406 and queries whether the current logical field maps to underlying physical data using a filtered access method. If so, the concrete query contribution is built (step 408) based on a physical data location for some physical data entity. At step 409, the runtime component 150 modifies the query contribution to include SWSM account information in the results generated when the concrete query is executed. At step 410, the concrete query contribution is extended with additional logic (filter selection) used to restrict the data returned from the physical data entity. Processing then continues according to method 300 described above.

If the access method is not a filtered access method, processing proceeds from step 406 to step 412 where the method 400 queries whether the access method is a composed access method. If so, then the physical data location for each subfield reference in the composed field expression is located and retrieved at step 414. At step 416, the physical field location information of the composed field expression is substituted for the logical field references of the composed field expression, and the runtime component 150 generates the concrete query contribution for the composed field. At step 417, the query contribution is modified so that SWSM account information is included in the resulting composition generated for the composed fields. Processing then continues according to method 300 described above.

If the access method is not a composed access method, processing proceeds from step 412 to step 418. Step 418 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used. Additionally, when the runtime component processes other access methods, the concrete query contributions generated for the other access methods retrieve SWSM account information along with the data represented by the logical field.

As described above, it may be necessary to perform a data conversion if a logical field specifies a data format different from the underlying physical data. In one embodiment, an initial conversion is performed for each respective access method when building a Concrete Query Contribution for a logical field according to the method 400. For example, the conversion may be performed as part of, or immediately following, the steps 404, 408, and 416. A subsequent conversion from the format of the physical data to the format of the logical field is performed after the query is executed at step 322. Of course, if the format of the logical field definition is the same as the underlying physical data, no conversion is necessary.

Figure 5:
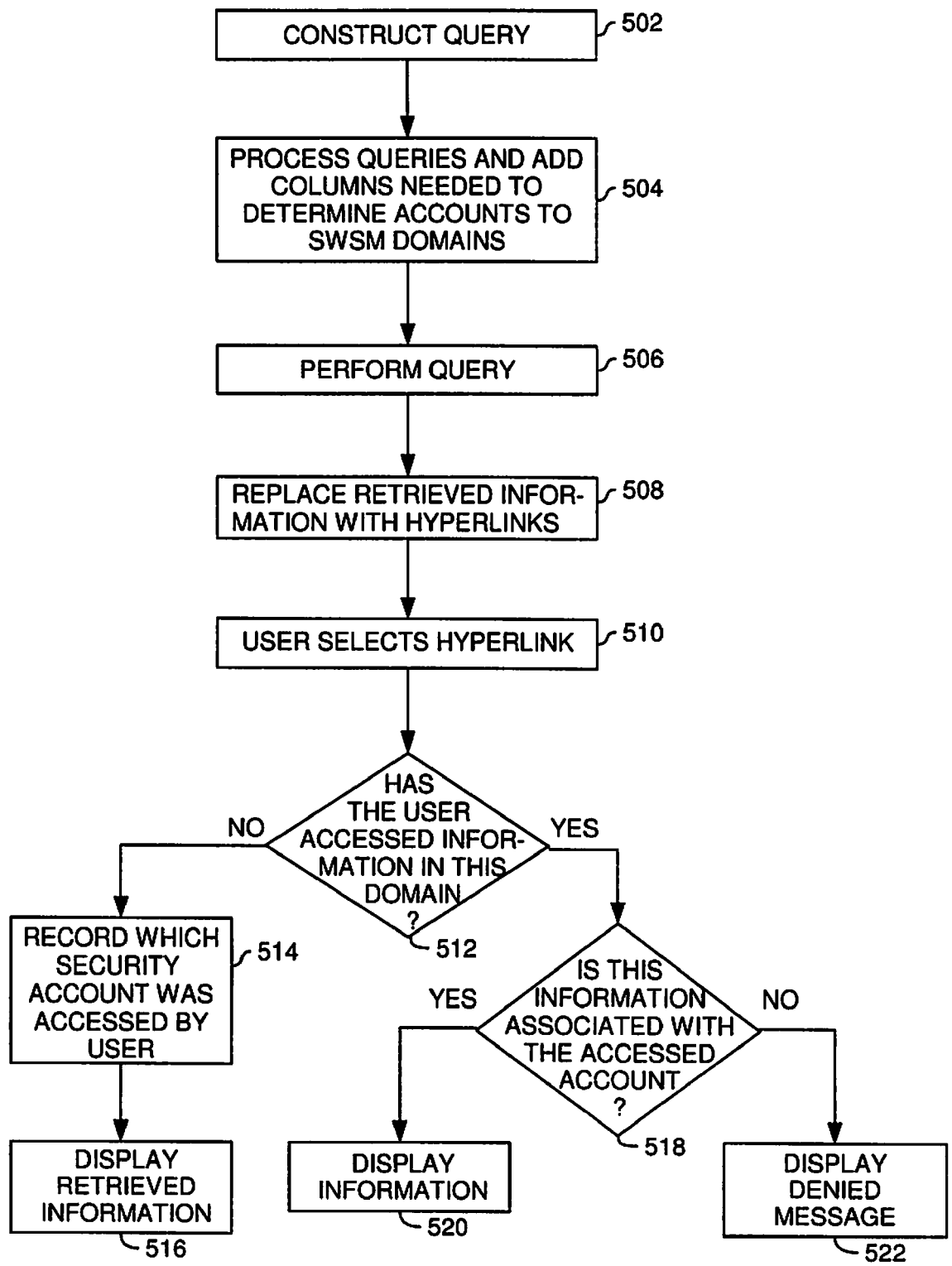
FIG. 5 is a flow chart of a method for managing access to confidential data.

FIG. 5 illustrates a method for processing an abstract query that includes SWSM information, according to one embodiment of the invention. Operations 500 begin at step 502, where a user constructs an abstract query. Alternatively, some embodiments may allow users to store previously composed queries. Thus, at step 502, a user may retrieve a saved query and, after making any desired modifications, submit the abstract query for execution.

At step 504, the runtime component 150 translates the abstract query (e.g., abstract query 602 illustrated in FIG. 6A) into a concrete query according to the methods described above in conjunction with FIGS. 3 and 4. While doing so, the runtime component 150 extends the concrete query contributions to retrieve SWSM account information corresponding to each logical field appearing in the query. In an alternative embodiment, SWSM query contributions may be derived and added to the concrete query after the abstract query translation process.

Figure 9:
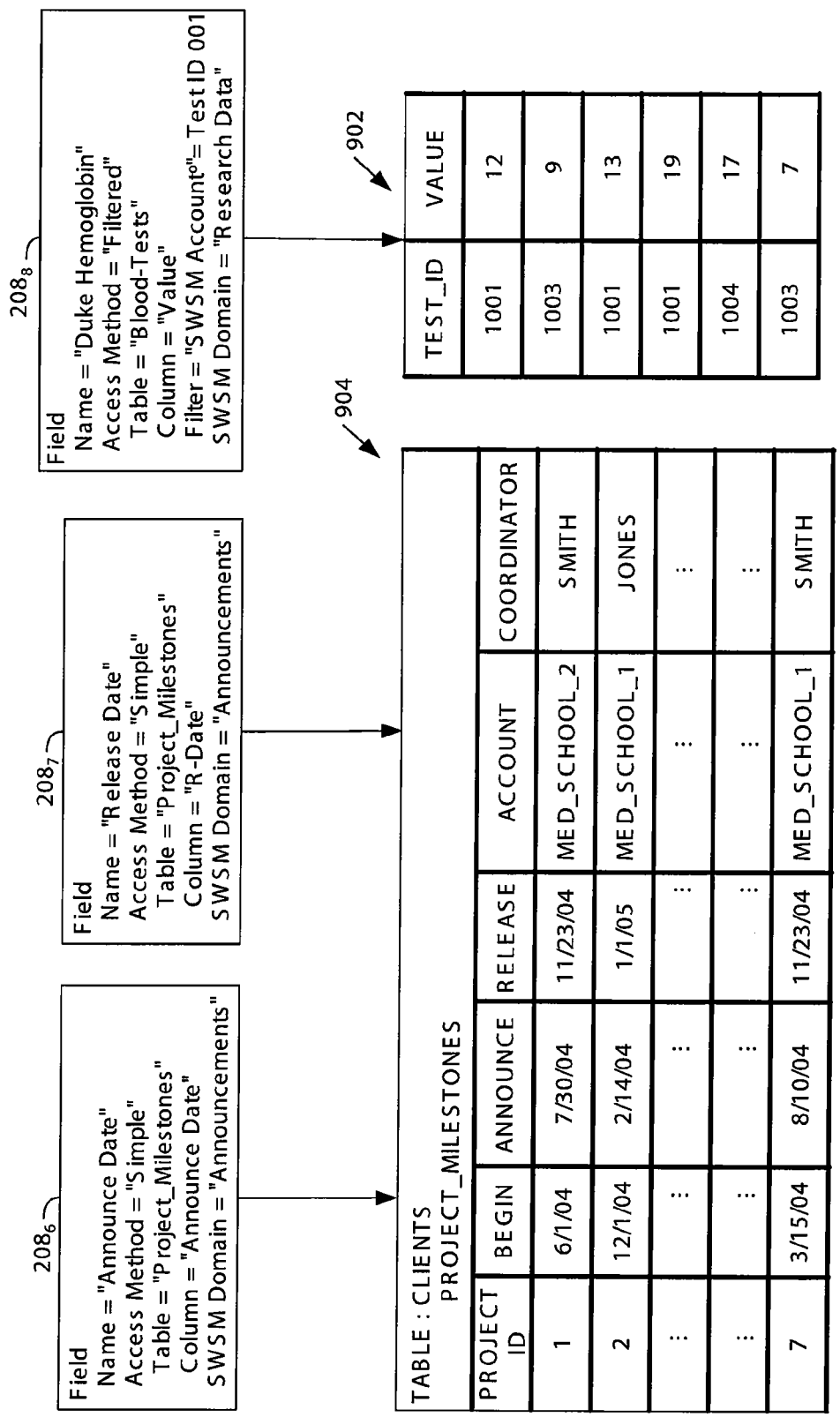
FIG. 9 shows an illustrative abstract query and underlying relational database table.

Multiple fields may be associated with the same SWSM domain. Thus, entire rows of a relational table (or hierarchical elements of an XML data source) may be associated with the same SWSM account. Doing so allows blocks of related information to be associated with the same SWSM account. For example, FIG. 9 illustrates two logical fields 208 with field names of "release date" (field $208_7$) and "announce date" (field $208_6$). Both of these fields belong to a SWSM "Research Group Announcements" domain and map, via a simple access method, to a "clients' project_milestones" relational table 904. During step 504, the execution of a query that retrieves announcement dates, the runtime component 150 adds a SWSM contribution that will include "account" column in the results. Once a user accesses an announcement date for one account, that user may be prevented from accessing release dates of other accounts. Note, the additional information retrieved by the SWSM contribution is used to enforce the security policy of the SWSM and may not be displayed to a user.

Returning to FIG. 5, operations 500 continue at step 506. The runtime component 150 executes the completed query, as modified by any SWSM contributions. For example, FIG. 6A illustrates an abstract query 602 with two logical fields (specifically, fields $208_6$ and $208_7$ of FIG. 9) that map to data stored in a "clients' project milestones" table 902 (illustrated in FIG. 9.) The two logical fields included in abstract query 602 retrieve all of the items appearing in the release dates and the account columns of the client's project milestones table.

At step 508, after executing the completed query and retrieving data from the physical data sources, in one embodiment, the runtime component 150 replaces information protected by a SWSM domain with hyperlinks to the protected information. For example, the GUI screen 604 illustrated in FIG. 6B shows the results for the account column logical field and the release date logical field from abstract query 602. Illustratively, column 604 lists three accounts, Med_School_1, Med_School_2, and Med_School_3. The release dates illustrated in column 606, however, have been replaced with hyperlinks to the actual data. In this illustration, the user has not accessed any information belonging to a specific SWSM account in the SWSM "research group announcements" domain. Accordingly, the user is presented with a hyperlink to each of the release dates included in the search results generated from abstract query 602. The "accounts" column itself is not protected by a SWSM domain; rather, it identifies the account corresponding to protected information (i.e., other data items in the row). A logical field may indicate that it is not a member of a SWSM domains by having a "NONE" value appear in the logical field SWSM domain attribute. Alternatively, the field specification 208 may omit the security attribute naming a SWSM domain.

Figure 6C:
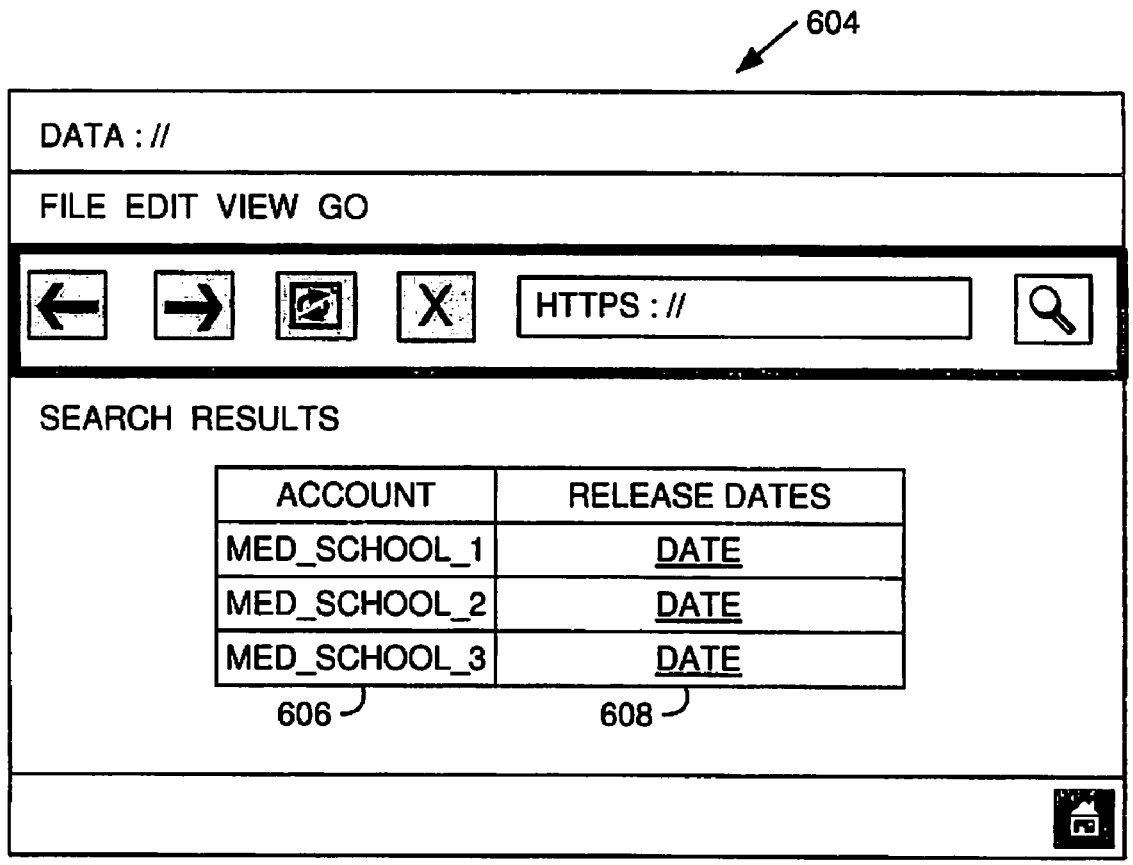
Figure 6C:
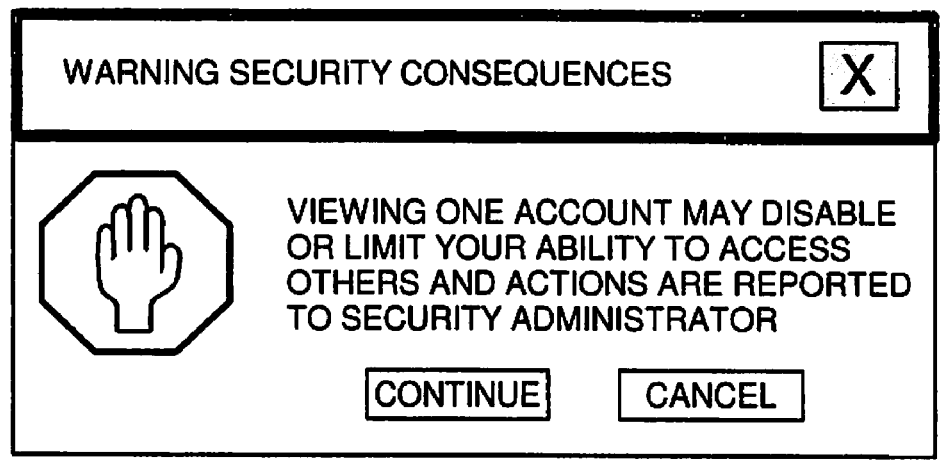

In step 510, once the user selects to view data associated with one of the SWSM accounts (e.g., clicks on a Med_School_1 release date), a dialog box, such as the one illustrated in FIG. 6C, may be displayed, informing the user that accessing the Med_School_1 release dates will cause the system 100 to a construct a "Security wall" around other SWSM accounts in the SWSM "research group announcements" domain.

In step 512, after a user selects to view information protected by a SWSM domain, the runtime component 150 determines whether the user has already accessed information belonging to a SWSM account, within the SWSM domain associated with the logical field. If not, the user is free to view data associated with any SWSM account in the SWSM domain. Accordingly, at step 514, the identity of the user and the SWSM account associated with the data accessed by the user is recorded. It is at this step where the Security wall is constructed that prevents the user from subsequently accessing data from a different SWSM account in the same SWSM domain.

In one embodiment, the runtime component 150 records this information in a security matrix. FIG. 8, illustrates a security matrix 800 that records the SWSM accounts in a SWSM domain that a user has previously accessed. As illustrated, the rows of the security matrix 800 correspond to users and the columns correspond to SWSM domains. Initially, a user has not accessed any information belonging to a SWSM account and the cells of the security matrix are empty. As a user accesses protected data, the security matrix 800 is modified to reflect that the user has accessed information belonging to a specific SWSM account. For example, the security matrix 800 indicates that the user "Burns" 806 has previously accessed data associated with the "Med_School_1" account in the "universities" domain and the "Med_School_2" account in the "Hospitals" SWSM domain. The security matrix 800 describes the "Security walls" constructed around each user.

After the user's activity is recorded in the security matrix 800, the information requested by the user is displayed (step 516). For example, assume that the user "Jones" appearing in the security matrix 800 is constructs abstract query 602 (FIG. 6A). The first time Jones executes the query, the security matrix does not indicate that Jones has previously accessed data from the "customer announcement dates" SWSM domain 804. Accordingly, the user "Jones" may be presented with the GUI screen shown in FIG. 6B. As illustrated, an output formatter has replaced the he information protected by the SWSM accounts with hyperlinks to the data. By placing a layer between the users and the protected data, users may make active choices about what data to access. If the user "Jones" accesses the "Med_School_1" data, this access is recorded in the security matrix 800.

At step 518, if the runtime component 150 determines that the user has accessed information associated within a SWSM domain, the runtime component then determines whether the user is requesting to view information associated with the same SWSM account that the user has accessed in the past. If so, then the information is "on the same side of the wall" as the user, and at step 520, the requested data is displayed to the user. Otherwise, at step 522, a user has requested access to data from a SWSM account on the "other side" of a Security wall. In one embodiment, the user is displayed a message that the information is protected by a SWSM domain and unavailable for display For example, FIG. 7 shows a GUI screen generated in response to a subsequent execution of the abstract query 602 after a user has accessed to data associated with the "Med_School_1" account in the SWSM "announcements" domain. As illustrated, the "Med_School_1" announcement dates are displayed to the user without the use of an intervening hyperlink like the one shown in FIG. 6B. Because the user has previously accessed "Med_School_1" data, this information is available and "on the same side of the wall" as the user. However, the announcement dates for the "Med_School_2" account are unavailable for display to this user. Accordingly, the search results only show data that the user is authorized to access. In another embodiment, data protected by a SWSM domain is removed from any results data (or a query may be modified to prevent the retrieval of data protected by a SWSM domain) with no indication to the user. Sometimes a service provider may desire to prevent an individual from knowing that information exists, because in some cases even knowing that certain information exists, without knowing its substance, may create a conflict of interest for that user.

In an alternative embodiment, the Med_School_2 information (that has been removed by an output formatter) may be available to certain users who are authorized to view data within a SWSM domain for multiple accounts. In this case, the "Med_School_2" data might be displayed as a hyperlink and a user requesting data "on the other side of Security wall" may be required to enter a SWSM override code to view the requested data.

For some embodiments, the security matrix 800 may store additional information related to the activity of a user. For example, the security matrix 800 may store when the user accessed information belonging to a SWSM account within a SWSM domain. This information may be used in embodiments where SWSM restrictions expire after a given amount of time, where certain users may be authorized to "move through" a given Security wall, or where previously confidential data later becomes public In another embodiment, a user may not be authorized to view information within a SWSM domain belonging to a particular account, regardless of whether the user has accessed data in other accounts. For example, a database service provider may assign certain employees to consult with a specific client and choose to construct a "Security wall" around the employee prior to their accessing any data.

Further, embodiments of the present invention may allow multiple logical fields based on SWSM account data to be constructed. For example, a model of information sharing may be employed where a single table stores data for multiple parties. Multiple logical fields could use a filtered access method to restrict abstract query results to data for associated with a named SWSM account. Illustratively, FIG. 9 depicts a logical field $208_8$ that includes a filtered access method with a filtering expression based on a SWSM account. The test results table 902 stores a test ID which can be resolved to a SWSM account name by another table and test results. In this example, assume that test ID 1001 corresponds to the SWSM account "Med_School_1" and test ID's belong to other accounts. Using filtered fields based on SWSM account information simplifies centralized data storage, while simultaneously protecting data associated with individual accounts from accidental contamination with other groups. In addition, and abstract queries that retrieve data from multiple SWSM accounts may be used where a user is authorized to access information associated with multiple accounts in a SWSM domain. For example, a filtered field "combined hemoglobin" using a filter expression of ((SWSM Account ="1001") or (SWSM account ="1002")) would combine information related to the two SWSM accounts.

Further, the data abstraction layer may be modified for a user using SWSM information. Specifically, once a user is behind a particular "wall," logical fields, such as the ones described in the previous paragraph that are associated with an account "on the other side of the wall" may simply be removed from the data abstraction layer available to a particular user in composing queries.

Embodiments of the present invention allow different users to store data using an abstract data model that separates users from the logical content and substance of data from the underlying mechanisms used to store the data. Additionally, embodiments of the present invention increase data security by using a Security wall security model. The SWSM model limits the access that a user has based on that users prior activity.

It should be noted that any reference herein to particular values, definitions, programming languages and examples is merely for purposes of illustration. Accordingly, the invention is not limited by any particular illustrations and examples. Further, while aspects of the invention are described with reference to SELECTION operations, other input/output operation are contemplated, including well-known operations such as ADD, MODIFY, INSERT, DELETE and the like. Of course, certain access methods may place restrictions on the type of abstract query functions that can be defined using fields that utilize that particular access method. For example, fields involving composed access methods are not viable targets of MODIFY, INSERT and DELETE.

While the foregoing is directed to embodiments of the present invention, other and further embodiments of the invention may be devised without departing from the basic scope thereof, and the scope thereof is determined by the claims that follow.

What is claimed is:

1. A method of controlling access to data stored in a data repository, comprising:
   receiving, from a requesting entity, an abstract query composed from a set of logical fields, wherein each logical field provides an access method that specifies at least a method for accessing the data and a security domain associated with the logical field, and for each logical field:
   generating a query contribution for retrieving query result data;
   modifying each query contribution to additionally retrieve security account information corresponding to query result data to be retrieved by the query contribution;
   retrieving the query result data using the modified query contribution for the logical field; and
   determining, using a programmed microprocessor whether the requesting entity is authorized to access the query result data by:
   identifying the requesting entity,
   determining whether the requesting entity has previously accessed data from the security domain associated with the logical, and if not, including an indication in a set of combined query results that data for the logical field is available for access, and otherwise, comparing the security account information associated with the query result data with a security account of data previously accessed by the requesting entity, and if the security accounts match, including the query result data in the combined query results; and
   combining the query result data into the set of combined query results; and returning an indication of the combined query results to the requesting entity.

2. The method of claim 1, wherein security account information comprises information sufficient to identify a security account associated with the query results data retrievable using the logical field.

3. The method of claim 1, wherein generating a query contribution comprises transforming the logical field, according to the access method provided by the logical field, into a query executable by a database management system.

4. The method of claim 1, wherein the security domain enumerates a set of security accounts wherein allowing the same requesting entity to access data associated with more than one security account within a particular security domain would create a conflict of interest for the requesting entity.

5. The method of claim 1, wherein determining whether the requesting entity has previously accessed data from the same security domain as the security domain provided by the logical field, comprises accessing a security matrix that indicates the security accounts, within each security domain, for which the requesting entity has previously accessed data.

6. The method of claim 5, wherein the security matrix indicates that a requesting entity has previously accessed data associated with a particular security account for a given security domain for a limited time period subsequent to the user accessing the data.

7. The method of claim 1, wherein including an indication in the completed query results that data from the security domain is available for access comprises replacing the query results data a hyperlink that when clicked by the requesting entity accesses the requested data and returns the requested data to the user.

8. The method of claim 7, further comprising, recording the security account and security domain associated with data accessed by the requesting entity.

9. The method of claim 7, wherein prior to returning the requested data, the requesting entity is presented with an indication that accessing the query results data will prevent the user from accessing data associated with other security accounts within the same security domain.

10. The method of claim 7, wherein presenting the requesting entity with an indication that accessing the query results data will prevent the user from accessing data associated with other security accounts within the same security domain comprises displaying one or more graphical user interface screens to the requesting entity.

11. The method of claim 1, further comprising including in the combined query results an indication that the requesting entity is not authorized to access some of the query results data.

12. The method of claim 11, further comprising prompting the requesting entity for authorization data allowing the requesting entity to access data associated a security account different than a security account previously accessed by the requesting entity.

13. The method of claim 11, wherein prompting the requesting entity for authorization data comprises presenting the requesting entity with at least one graphical user interface screen.

14. The method of claim 1, wherein determining whether the requesting entity is authorized to access the query result data comprises:
   identifying the requesting entity; and
   retrieving, from a security matrix, a set of security authorizations corresponding to the requesting entity that specifies what security accounts for which the requesting entity may access any associated data.

15. A computer-readable storage medium containing a program, which, when executed on a processor, performs an operation for controlling access to data stored in a data repository, the operation comprising:
   receiving, from a requesting entity, an abstract query composed from a set of logical fields, wherein each logical field provides an access method that specifies at least a method for accessing the data and a security domain associated with the logical field, and for each logical field:
   generating a query contribution for retrieving query result data;
   modifying each query contribution to additionally retrieve security account information corresponding to query result data to be retrieved by the query contribution;

retrieving the query result data using the modified query contribution for the logical field; and determining whether the requesting entity is authorized to access the query result data by;

identifying the requesting entity, determining whether the requesting entity has previously accessed data from the security domain associated with the logical field, and if not, including an indication in a set of combined query results that data for the logical field is available for access, and otherwise, comparing the security account information associated with the query result data with a security account of data previously accessed by the requesting entity, and if the security accounts match, including the query result data in the combined query results; and combining the query result data into a the set of combined query results; and returning an indication of the combined query results to the requesting entity.

16. The computer-readable storage medium of claim 15, wherein including an indication in the completed query results that data from the security domain is available for access comprises replacing the query results data a hyperlink that when clicked by the requesting entity accesses the requested data and returns the requested data to the user.

17. The computer readable storage medium of claim 15, wherein the operation further comprises, recording the security account and security domain associated with data accessed by the requesting entity.

18. A system, comprising:

a processor; and a memory containing a program, which when executed on the processor, performs an operation for controlling access to data stored in a data repository, the operation comprising:

receiving, from a requesting entity, an abstract query composed from a set of logical fields, wherein each logical field provides an access method that specifies at least a method for accessing the data and a security domain associated with the logical field, and for each logical field:

generating a query contribution for retrieving query result data;

modifying each query contribution to additionally retrieve security account information corresponding to query result data to be retrieved by the query contribution;

retrieving the query result data using the modified query contribution for the logical field; and determining whether the requesting entity is authorized to access the query result data by:

identifying the requesting entity, determining whether the requesting entity has previously accessed data from the security domain associated with the logical field, and if not, including an indication in a set of combined query results that data for the logical field is available for access, and otherwise, comparing the security account information associated with the query result data with a security account of data previously accessed by the requesting entity, and if the security accounts match, including the query result data in the combined query results, and combining the query result data into the set of combined query results;

and returning an indication of the combined query results to the requesting entity.

19. The system of claim 18, wherein including an indication in the completed query results that data from the security domain is available for access comprises replacing the query results data a hyperlink that when clicked by the requesting entity accesses the requested data and returns the requested data to the user.

20. The system of claim 19, wherein the operation further comprises, recording the security account and security domain associated with data accessed by the requesting entity.

* * * * *